Figure 1A:
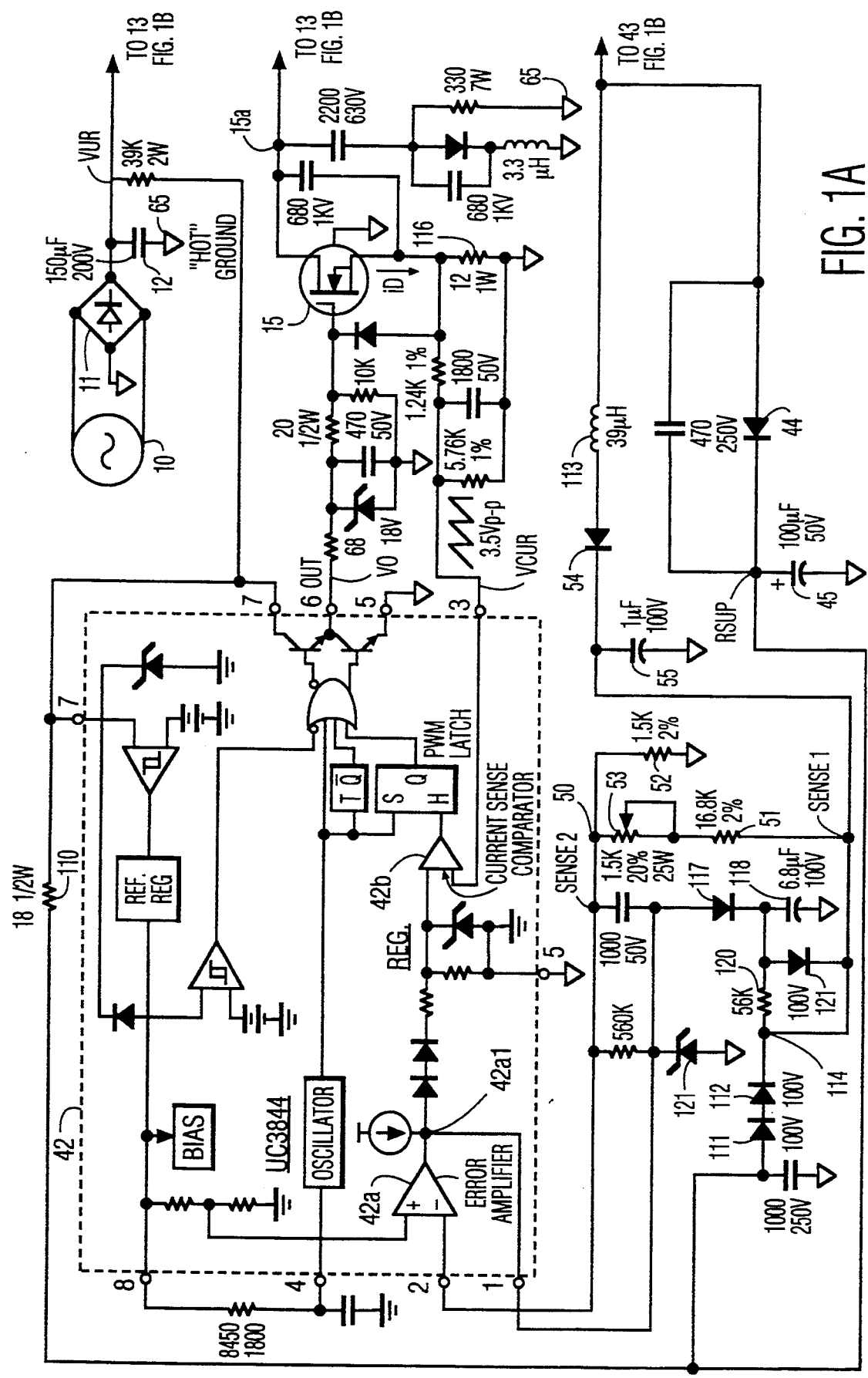

United States Patent [19]
Nath

[11] Patent Number: 5,391,978
[45] Date of Patent: Feb. 21, 1995

[54] FEEDBACK LOSS PROTECTION ARRANGEMENT IN A POWER SUPPLY

[75] Inventor: Gautam Nath, Fishers, Ind.

[73] Assignee: Thomson Consumer Electronics, Inc., Indianapolis, Ind.

[21] Appl. No.: 200,039

[22] Filed: Feb. 22, 1994

[51] Int. Cl.⁶ .......................... G05F 1/40; H02H 7/10
[52] U.S. Cl. .................................. 323/282; 363/50
[58] Field of Search ............... 323/282, 285, 276, 280; 363/50, 21

[56] References Cited

U.S. PATENT DOCUMENTS

| | | | |
|---|---|---|---|
| 4,621,313 | 11/1986 | Kiteley | 363/49 |
| 4,658,342 | 4/1987 | Wharton | 363/21 |
| 4,731,720 | 3/1988 | Takahashi | 363/21 |

*Primary Examiner*—R. Skudy
*Assistant Examiner*—E. To
*Attorney, Agent, or Firm*—Joseph S. Tripoli; Joseph J. Laks; Sammy S. Henig

[57] ABSTRACT

In a switch mode power supply a voltage developed in an isolating transformer is rectified via a first diode and coupled via a feedback path to a control terminal of a regulator. The voltage is also rectified via a second diode and coupled to a supply terminal of the regulator. A pair of diodes are coupled in series between the supply and control terminals. During normal operation, the pair of diodes are non-conductive. When, under a fault condition, the first diode is disconnected, the pair of diodes provide a redundant or alternative feedback path in a manner to prevent excessive output level of the power supply.

8 Claims, 2 Drawing Sheets

FEEDBACK LOSS PROTECTION ARRANGEMENT IN A POWER SUPPLY

This invention relates to power supplies for video apparatus.

The power supply used in a video apparatus is typically required to provide precise regulated voltage supply levels in order that the load circuits powered by the supplies operate as desired. A typical power supply of the switching type incorporates a transformer having a primary winding and a number of secondary windings, to which the load circuits are connected. A switching device, such as a transistor, periodically applies a source of unregulated voltage derived from the AC line to the transformer primary windings. Feedback from one of the secondary windings controls the conduction angle of the switching device to provide regulation of the voltages developed across the secondary windings.

When the video apparatus includes user-accessible input or output terminals, electrical isolation is provided between the user-accessible terminals and the AC line to prevent the possibility of electrical shock. This electrical isolation is defined as an impedance of such a magnitude that the maximum current that can flow between the AC line and the user-accessible terminals will be below a recognized safe level. The previously described electrical isolation is economically provided by isolating the primary "hot" winding and the secondary "cold" windings of the power supply transformer by the use of a predetermined amount of insulating material and sufficient physical separation of the windings.

Typically, in power supplies having a voltage regulator that is referenced to the hot ground, a first winding of the transformer that is referenced to the "hot" ground develops a voltage that is rectified via a diode to produce a rectified feedback control signal that is coupled to a control terminal of the regulator. The rectified feedback signal is required to track an output level of the power supply for providing acceptable regulation.

A loss of the rectified control signal due to a fault condition may cause the voltage regulator to increase the output level of the power supply. This is so because the loss of feedback voltage results in a false indication that the output level is too low.

Typically, a power supply of a video display apparatus that includes a picture tube includes an X-RAY protection circuit that causes shut down of the power supply when an over voltage condition is detected. Thus, a power supply that produces a high voltage for the picture tube may be inherently protected against a loss of the rectified feedback voltage by the operation of the X-RAY protection circuit. However, in an audio power supply or in a video power supply for a satellite decoder unit that operates separately from a television receiver and that does not include a picture tube, hence, does not include an X-RAY protection circuit, the possibility of a loss of feedback is of a greater concern. This is especially so when, for cost reasons, an overvoltage detection and protection circuit is not included in the power supply.

In a power supply, embodying an aspect of the invention, an alternative feedback path is provided to the control terminal of the regulator. The alternative feedback path includes a switch. The switch couples a rectified voltage to the control terminal of the regulator when a fault condition occurs.

The fault condition occurs when, for example, a diode that produces the normal operation feedback voltage is disconnected and, thereby, the normal operation feedback path is interrupted. In this way redundancy is provided. Because of the alternative feedback path, regulation is provided when the fault condition occurs. Therefore, excessive output level of the power supply is prevented.

Figure 1B:
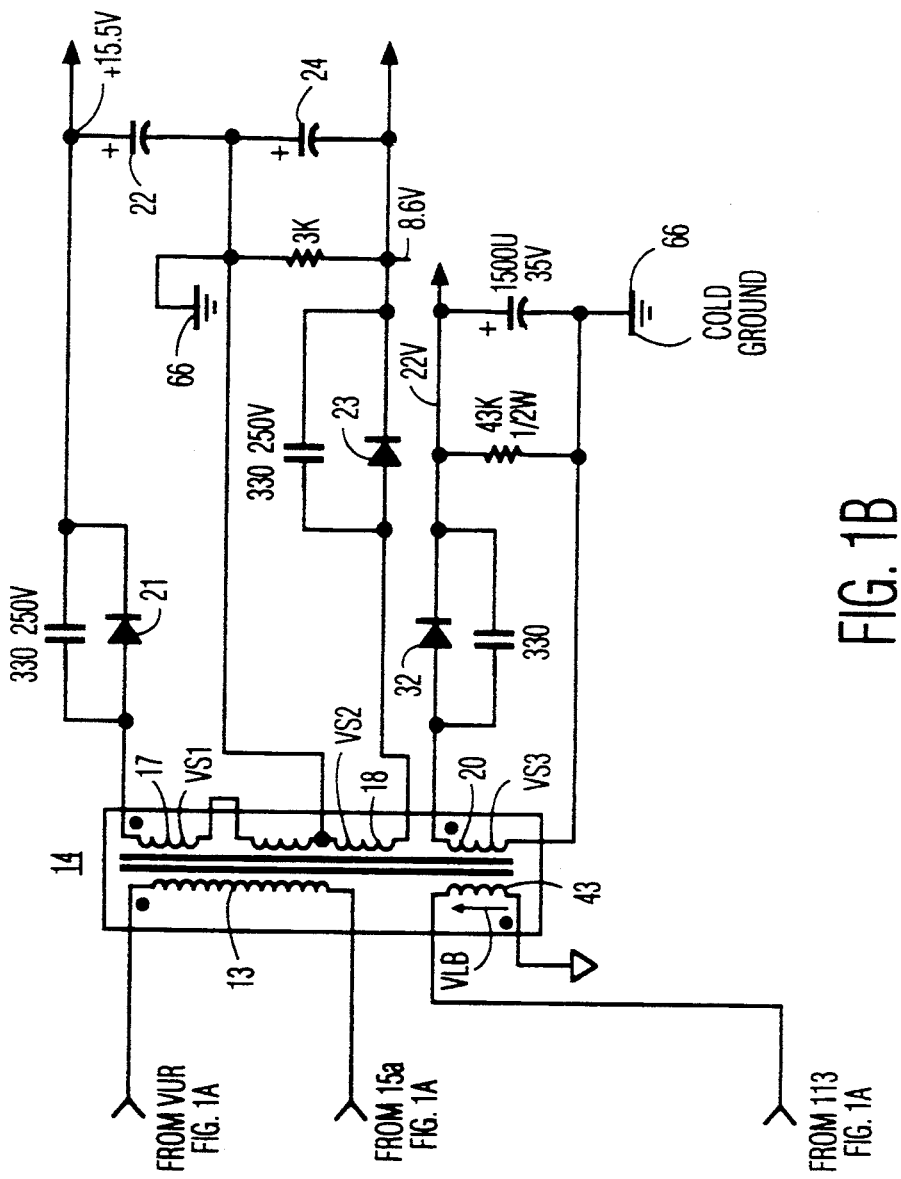

FIGS. 1A and 1B are a schematic of a switched mode power supply in accordance with an aspect of the invention.

In a video display power supply apparatus of FIG. 1, an AC voltage produced by an AC power source 10 is rectified by a rectifying circuit 11 and filtered by a capacitor 12 to provide a source of an unregulated DC voltage VUR. This DC voltage is applied to one terminal of a primary winding 13 of a power transformer 14. The other terminal of winding 13 is coupled via a terminal 15a to a drain electrode of switching transistor 15. Conduction of transistor 15 causes current to flow, thereby the development of a voltage across winding 13, which by transformer action causes voltages VS1, VS2 and VS3 to be developed across secondary windings 17, 18 and 20 in each cycle when transistor 15 is switched off.

The voltage developed across winding 17 is rectified by diode 21 and filtered by capacitor 22 to produce a DC voltage illustratively of the order of +15.5 volts that may be used to provide power to an external device. Similarly, the voltage developed across winding 18 is rectified by diode 23 and filtered by capacitor 24 to produce a second DC voltage and the voltage developed across winding 20 is rectified by diode 32 and filtered by capacitor 33 to produce a third DC voltage.

It may be desirable that a user-accessible terminal, such as might be associated with audio circuits, be electrically isolated from the AC power source 10, which is typically the an AC line supply. This electrical isolation is defined as an impedance between the isolated components of such a magnitude that the maximum current that can flow between the components is below a predetermined safe level. The voltages developed with respect to components or circuitry associated with the AC power source 10 are therefore referenced to a first reference potential, so-called hot ground, while the voltages developed with respect to the components or circuit associated with the user-accessible terminals are referenced to a second reference potential, so-called cold or chassis ground.

In the circuit of FIG. 1, the previously described electrical isolation is provided by transformer 14, which incorporates sufficient physical separation and insulating material to meet the appropriate isolation requirements as specified, for example, by Underwriters Laboratories. The components and circuitry coupled to winding 13 are referenced to "hot" ground and are shown with a particular ground symbol, illustratively designated 65 in FIG. 1. The components and circuitry coupled to windings 17, 18 and 19 are referenced to "cold" ground and are shown as having a different ground symbol, illustratively designated 66 in FIG. 1.

As previously described, the switching flyback voltage developed when transistor 15 is nonconductive acts to develop voltages across windings 17, 18 and 20. It may be desirable for proper operation of the load circuits coupled to these windings that the voltages produced are carefully regulated. Regulation may be readily maintained by controlling the conduction duration of switching transistor 15, which in turn determines the magnitude of the voltages developed across windings 17, 18 and 20. The conduction of transistor 15 is controlled by a pulse width modulated base drive switching signal V0 from a regulator control circuit 42. Circuit 42 is realized with an integrated circuit UC3844.

A winding 43 of transformer 14 develops a sample voltage VLB which is referenced to the AC voltage source reference potential, or "hot" ground. The voltage developed across windings 17, 28 and 20 is closely tracked by sample voltage V43 developed across winding 43. The voltage across winding 43 is rectified by a diode 44 and filtered by a capacitor 45 to produce a DC voltage RSUP. DC voltage RSUP provides via a resistor 110 a supply voltage VCC for energizing switched mode power supply regulator control circuit 42.

Voltage V43 also is coupled via a filtering coil 113 to a rectifying diode 54. Diode 54 develops a feedback signal SENSE1 at a terminal 113, in a filter capacitor 55. Signal SENSE1 at terminal 114 is applied to a feedback control terminal 50 of control circuit 42 via a voltage divider formed by resistors 51, 52 and variable resistor 53 to form a regulator control feedback signal SENSE2. Feedback signal SENSE2 is used to control the conduction duration of transistor 15 to maintain regulated voltages across windings 17, 18, 20 and 43. Signal SENSE2 is compared in a conventional manner with a signal at a reference level in an error amplifier 42a. An output terminal 42a1 of amplifier 42a is coupled to an input of a comparator 42b. A second input of comparator 42b receives a ramp signal VCUR. Signal VCUR that is applied from a source resistor 116 of transistor 15 is representative of a source-drain current iD in transistor 15. As a result, an output signal V0 of regulator 42 is pulse-width modulated and produced in a conventional current mode manner.

Assume that, as a result of a fault condition, either coil 113 or diode 54 forms a discontinuity in the feedback path. As a result, signal SENSE1 tends to decrease and to become zero. Consequently, regulator 42 tends to cause an increase in the duty cycle of signal V0 or of transistor 15. The result is a tendency to increase the output supply voltages in capacitors 22 and 24, for example, to a level above a safe level. Such fault condition, if not counteracted, could cause damage to circuit components because of exposure to an over-voltage condition. It may be desirable to control the output supply voltages in a manner to prevent excessive output levels.

In accordance with an inventive feature, a pair of diodes 111 and 112 are coupled in series between filter capacitor 45, where regulator supply voltage RSUP is developed, and terminal 114. When, as a result of the aforementioned fault condition, signal SENSE1 is not generated by the operation of diode 54, diodes 111 and 112 are forward biased and become conductive. As a result, signal SENSE1 is generated by the operation of diodes 111 and 112, instead of by the operation of diode 54. When dimes 111 and 112 are conductive, the output voltages in capacitors 22 and 24 increase substantially less than if the alternative, redundant feedback path via diodes 111 and 112 were not provided. Consequently, the reliability of the video apparatus that is energized by the arrangement of FIG. 1 is improved.

Advantageously, in normal operation diodes 111 and 112 are nonconductive and voltage RSUP does not affect signal SENSE1. This feature is desirable because voltage RSUP is developed in capacitor 45 that is substantially a larger capacitor than capacitor 55, hence, does not track the output supply voltages in a transient condition. Also, on capacitor 45 there might be a switching ripple due to driving of transistor 15. The switching ripple may be undesirable for regulation purposes. The usage of a pair of dimes for dimes 111 and 112 instead of one diode provides an increase in the noise immunity.

To provide soft start operation, output terminal 42a1 is coupled via a switch diode 117 to a capacitor 118. At start-up, capacitor 118 is fully discharged and prevents the output voltage at terminal 42a1 from rising fast. Consequently, the duty cycle in transistor 15 is initially short and increases gradually as capacitor 118 is charged via dime 117.

A resistor 120 is coupled to terminal 114 for maintaining diode 117 back-biased after the soft start interval has ended. Advantageously, a diode 121 that is coupled to capacitor 118 provides a fast discharge path for capacitor 118 via low value resistors 51, 52 and 53 when AC voltage 10 is interrupted. Because capacitor 118 is provided with the fast discharge path, soft start is available immediately after the power interruption has ceased.

What is claimed is:

1. A power supply apparatus, comprising:
    an inductance;
    a switching regulator coupled to said inductance for generating an alternating current in said inductance that is coupled to a load circuit, said regulator having a control terminal for receiving a control signal at said control terminal to control said inductance current in accordance with a difference between said control signal and a signal at a reference level;
    a first rectifier for rectifying a signal that is developed from said current in said inductance to generate a rectified first signal that is coupled to said control terminal of said regulator to form said control signal at said control terminal for controlling an output level of said power supply in a negative feedback manner in normal operation, such that when, as a result of a fault condition, said first signal is decoupled from said control terminal of said regulator, said regulator tends to cause an increase in said output level above a predetermined level;
    a second rectifier coupled to said inductance for rectifying a signal developed from said current in said inductance to generate a rectified voltage; and
    switching means for coupling said rectified voltage to said control terminal to control said inductance current in accordance with a difference between said rectified voltage and said signal at said reference level, said switching means providing for an alternate feedback path for preventing said output level increase when said fault condition occurs and for decoupling said rectified voltage from said control terminal in normal operation.

2. A power supply according to claim 1 wherein said rectified voltage energizes said regulator and wherein said switching means couples said rectified voltage to said control terminal when said fault condition occurs.

3. A power supply according to claim 2 wherein said switching means comprises a diode that couples a regulator supply voltage to said control terminal when said fault condition occurs.

4. A power supply according to claim 2 wherein said switching means comprises a pair of diodes coupled in series.

5. A power supply according to claim 1 wherein each of said first and second rectifiers comprises a corresponding first and second diode that is coupled via a common terminal to said inductance and wherein said switching means comprises a third diode that is coupled between an output of said second diode and an output of said first diode such that said control terminal is interposed between said third and first diodes.

6. A power supply according to claim 1 further comprising, a capacitor coupled via a first diode to an intermediate stage of said regulator to form a capacitive load during start-up to provide for soft start operation, and a second diode coupled to said capacitor and to said control terminal to provide for a fast discharge path to said capacitor during power turn off.

7. A power supply according to claim 1 wherein said inductance forms a winding of a transformer.

8. A power supply according to claim 7 further comprising, a source of a mains supply voltage that is coupled to said transformer in a non-isolated manner with respect to electrical shock hazard wherein said transformer provides isolation between said load circuit and said mains supply voltage and wherein each of said control signal and rectified voltage is non-isolated from said mains supply voltage.

* * * * *